July 26, 1938.    P. F. SPERRY    2,124,716
AIR DISTRIBUTING MEANS
Filed April 18, 1936    2 Sheets-Sheet 1

Inventor:
Philmore F. Sperry,
By Zabel, Carlson & Wells
Attorneys

July 26, 1938.  P. F. SPERRY  2,124,716
AIR DISTRIBUTING MEANS
Filed April 18, 1936  2 Sheets-Sheet 2
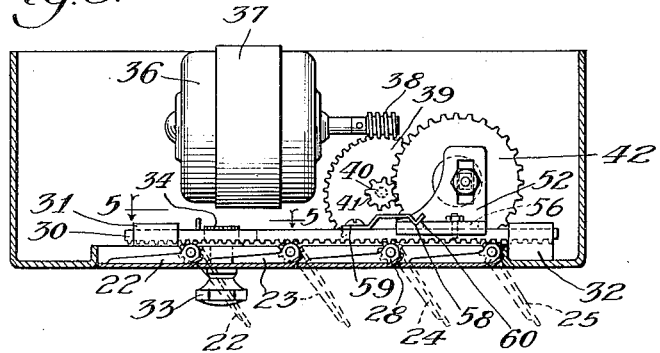
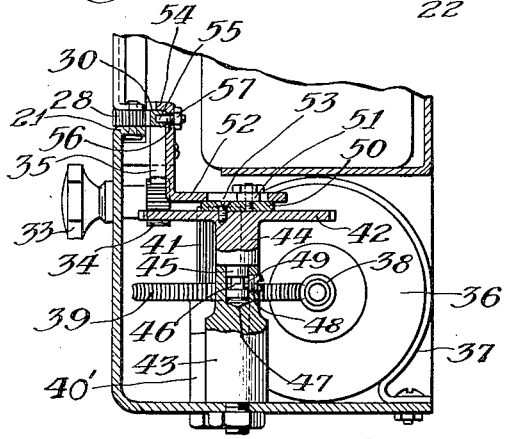
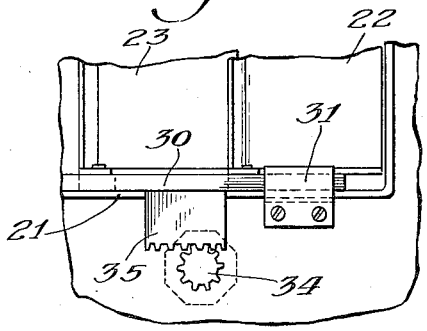
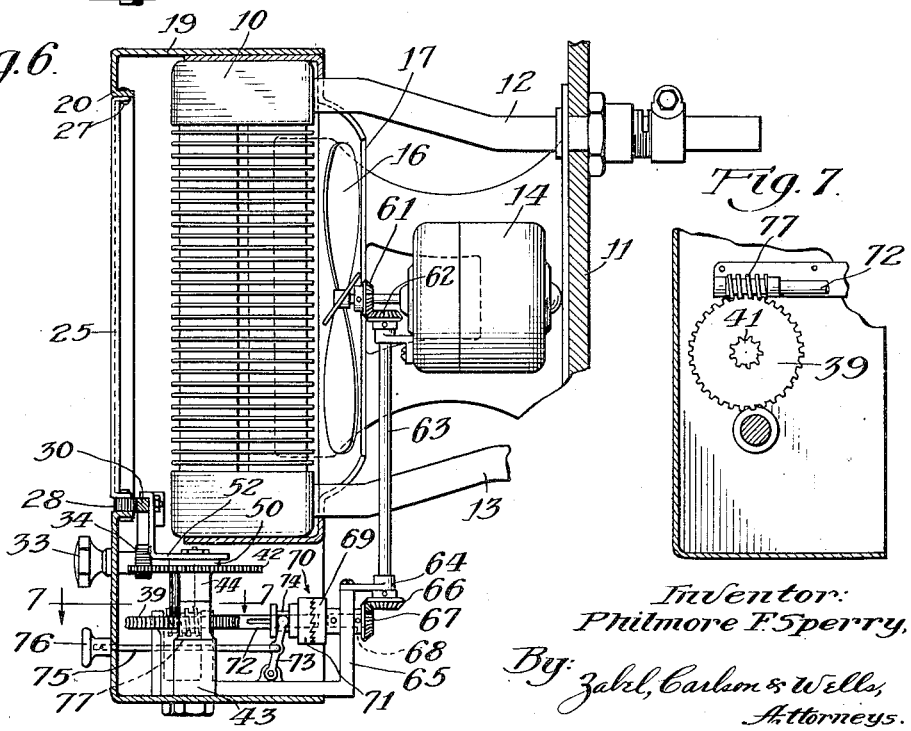
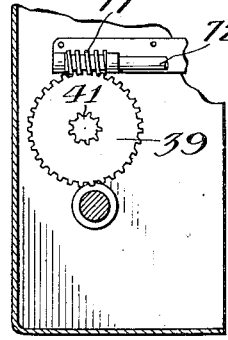
Inventor:
Philmore F. Sperry,
By Zahl, Carlson & Wells,
Attorneys.

Patented July 26, 1938

2,124,716

UNITED STATES PATENT OFFICE 2,124,716

AIR DISTRIBUTING MEANS

Philmore F. Sperry, Chicago, Ill., assignor to Excel Auto Radiator Company, Chicago, Ill., a corporation of Delaware Application April 18, 1936, Serial No. 75,123

6 Claims. (Cl. 230—274)

This invention relates to air distributing means for heaters which are commonly used in passenger automobiles.

The present invention is particularly adaptable to that type of structure wherein heat radiation is supplied by a heating fluid which heating fluid is heated by the engine of the automobile and circulated through a heat radiator that is placed inside the passenger compartment of the car. These devices usually employ a fan driven by a small motor for forcing air within the passenger compartment through channels in the radiator, and this air is distributed between a plurality of shutters or other baffle means for directing the air as it leaves the heat radiator.

The present invention contemplates the provision of a simple mechanism whereby the direction of the air which has been heated by the radiator may be continually varied so as to obtain a more uniform distribution thereof throughout the passenger compartment.

More specifically the invention provides for a mechanism operable manually or by a motor for moving the baffles or shutters that direct the air from the heat radiator. This mechanism is so constructed that the shutters may be driven from the motor through a yielding driving connection that will permit the operator to manually adjust the shutters and yet will permit the driving operation to proceed as soon as the motor is turned on even though the manual adjustment has caused a complete separation of the yielding driving connection.

Other features and advantages of the invention will become apparent as the description proceeds, reference being had to the accompanying drawings wherein a preferred form of the invention is shown.

In the drawings—

Fig. 3 is a sectional view on the line 3—3 of Fig. 1;

Fig. 4 is an enlarged sectional view substantially on the line 4—4 of Fig. 1;

Fig. 5 is a fragmentary view taken substantially on the line 5—5 of Fig. 3;

Fig. 6 is a sectional view like Fig. 2 illustrating a slightly modified construction; and Fig. 7 is a sectional view on the line 7—7 of Fig. 6.

Figure 1:
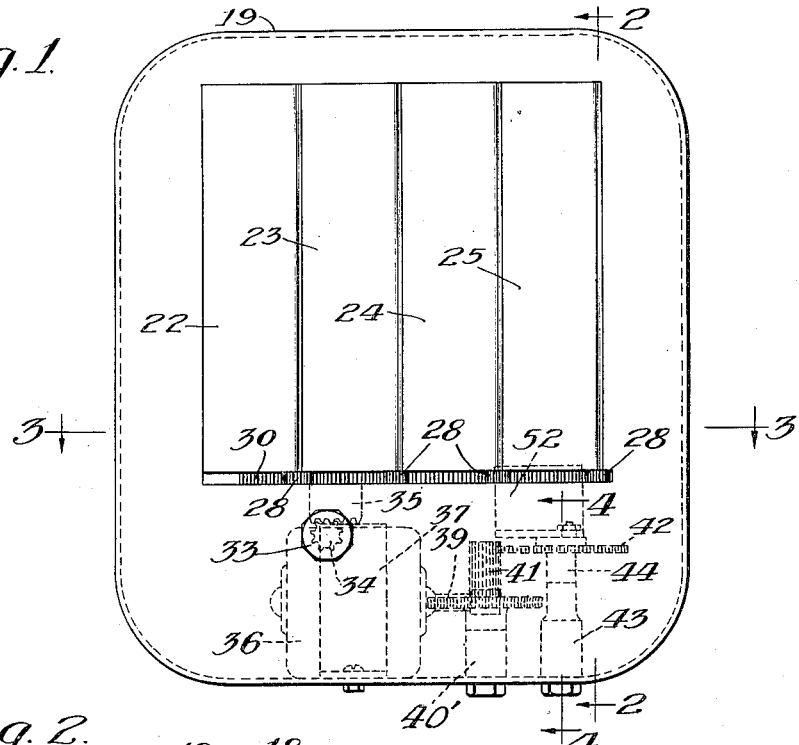
Fig. 1 is a front elevation of an automobile heater to which the invention has been applied.
Figure 2:
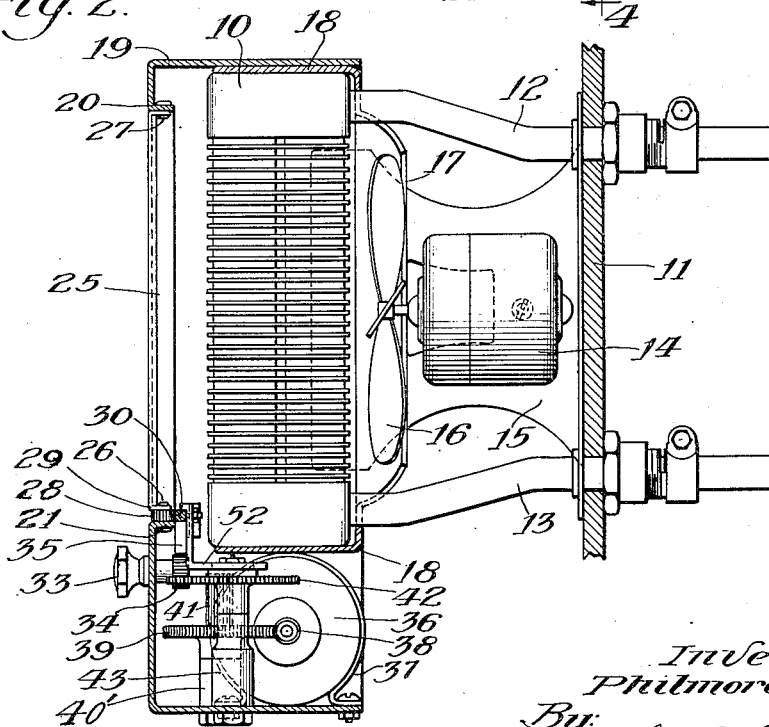
Fig. 2 is a sectional view on the line 2—2 of Fig. 1.

Referring now to the drawings, the invention is shown as applied to a heat radiator 10 which may be mounted upon a dash board 11 of an automobile, suitable pipes 12 and 13 being provided for connecting the radiator 10 to a source of heated fluid which is heated by the car engine. A motor 14 is supported by a framework 15. The motor 14 drives a fan 16 by means of which air is forced through the heat radiator 10, the cold air being drawn into the fan 16 through an opening 17 in a fan shield 18 that forms a part of the housing for the radiator 10.

The radiator 10 is encased in a sheet metal cup shaped housing 19 which telescopes with a portion of the fan shield 18 to complete the enclosure of the radiator 10. The housing 19 is open at the front and has a pair of turned in flanges 20 and 21 to which a plurality of shutters or baffles 22, 23, 24, and 25 are pivoted. The shutters may be pivoted in any suitable fashion such for example as by means of rivets 26 and 27. Each shutter has secured thereto a small pinion 28. This pinion may be secured to the shutter in any suitable fashion such for example as by welding or soldering it to a downturned flange 29 which is provided for pivotally securing the shutter in position. The several pinions 28 mesh with a rack 30, this rack being guided by a bracket 31 (see Fig. 5) at one end and by a similar bracket 32 shown in Fig. 3 at its other end. The brackets 31 and 32 are affixed to the housing 19 by screws or any other suitable means. It will be readily apparent that, if the rack 30 is reciprocated, it will cause a rocking movement of the pinions 28 so as to open and close the shutters 22, 23, 24, and 25. The shutters may be adjusted by hand by means of a finger piece 33 that is pivoted in the housing 19. This finger piece carries a pinion 34 which pinion meshes with a rack segment 35 which is fixed to the rack 30.

It is not satisfactory, however, to have to be continually adjusting the shutters in an air distributing device of this character, and the present invention provides means whereby the shutters may be automatically shifted at a continuous rate so as to distribute the air from the heat radiator in a much more effective manner. In a preferred form of the invention, a small electric motor 36 is mounted in the housing 19 by means of a suitable clamp 37. This motor has a worm 38 on its shaft. The worm 38 meshes with a worm gear 39 which is rotatably supported in the housing 19 by means of a stub shaft 40 which is rotatably held in a stud 40' secured to the housing 19. The worm gear 39 has on its hub a pinion 41 which is adapted to mesh with a large gear 42 which is journalled in a stud 43 fixed to the housing 19. As shown, the gear 42 has a hub 44 provided with a reduced extension forming a shaft 45 that is provided with an annular groove 46. The shaft 45 fits in a recess 47 provided in the stud 43, and a set screw 48 has a reduced end 49 that holds the shaft 45 in the stud 43 although it permits the gear 42 to rotate. The shaft 40 is rotatably secured in the stud 40' in the same fashion and therefore is not shown in detail.

The gear 42 is connected to the rack 30 through a yielding driving connection which will now be described. The gear 42 carries a plate 50 (see Fig. 4). This plate has pivoted thereon a block 51 which is eccentrically located with respect to the axis of rotation of the gear 42. A connecting plate 52 has an elongated rectangular slot 53 therein receiving the block 51 so that, upon rotation of the gear 42, a reciprocating motion may be imparted to the plate 52. This plate 52 has a flange 54 which fits over the rack 30, and the plate is slidably secured to the rack by means of a pin 55 fixed in the rack and projecting through an elongated slot 56 in the plate 52. A nut 57 is provided to hold the plate 52 on the pin 55. Thus reciprocating movement may be communicated to the plate 52 to cause it to reciprocate lengthwise of the rack 30.

To connect the rack 30 with the plate 52 and cause a reciprocating movement of the rack, there is provided a notch 58 (see Fig. 3) in the plate 52, and a spring 59 is fixed to the rack and provided with a V-shaped finger 60 adapted to seat in the notch 58. This provides a yielding connection between the rack 30 and the plate 52. In the normal operation, the finger 60 is seated in the notch 58, and the shutters such as 22 are oscillated to and fro as the rack 30 reciprocates. Should any obstruction get in the way of the shutters, then the notch 50 will permit the finger 60 to slide out of it so that the mechanism can continue to operate until the obstruction is removed from the shutters.

This connection is highly important in providing for the manual adjustment of the shutters. The finger 60 can readily be moved out of the notch 58 by manual rotation of the knob 33 to move the rack 30 when the gears 39 and 42 are stationary and the motor 36 is deenergized. When the motor is again started, the notch 58 can be engaged with the finger 60 in any position of the rack 30 because the pin 55 and the slot 56 limit the movement of the rack 30 relative to the plate 52.

In some instances, it may desirably be necessary to eliminate the additional motor 36 and to drive the shutter adjusting mechanism comprising the rack 30 from the motor 14. In Figs. 6 and 7, there is shown a mechanism whereby this may be accomplished. A pair of bevelled gears 61 and 62 connect the shaft of the motor 14 to a drive shaft 63 which extends downwardly to the rear of the housing 19 where its lower end is supported by means of a bearing 64 carried by a bracket 65. A pair of bevelled gears 66 and 67 couple the shaft 63 to a horizontally running shaft 68 that carries one element 69 of a clutch 70. The clutch 70 has another element 71 which is movable lengthwise on a worm shaft 72 but which is keyed thereto so as to rotate with the shaft 72. A control lever 73 fits in a clutch ring 74 formed with the clutch member 71 so as to move the member 71 away from the member 69 or toward it to operate the clutch. The lever 73 is operated by a link 75 which has a handle 76 thereon. The shaft 72 has a worm 77 thereon which meshes with the worm gear 39 to operate this in the same manner that the worm 38 does.

While certain embodiments of the invention have been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what I claim as new and desire to secure by Letters Patent is:

1. Air distributing means of the character described comprising a housing member having an aperture therein, a plurality of shutters movably mounted on said housing member for controlling and directing the flow of air through said aperture, and power driven means for continuously maintaining said shutters in motion, said power driven means comprising a reciprocating member operatively connected to said shutters, a motor, and mechanism operatively connecting the motor to said reciprocating member, said mechanism including an overload release operable at any time whether said motor is operating or not.

2. Air distributing means of the character described comprising a housing member having an aperture therein, a plurality of shutters pivotally mounted on said housing member for controlling and directing the flow of air through said aperture, and power driven means for continuously maintaining said shutters in motion to and fro about their pivotal mountings, said power driven means comprising a reciprocating member operatively connected to said shutters, a motor for driving said reciprocating member connecting means between said motor and said reciprocating member comprising a plate slidably mounted with respect to said reciprocating member, and operatively connected to said motor, a notch in said plate, and a spring pawl on said reciprocating member engageable in said notch.

3. Air distributing means of the character described comprising a housing member having an aperture therein, a plurality of shutters movably mounted on said housing member for controlling and directing the flow of air through said aperture, and power driven means for continuously maintaining said shutters in motion, said power driven means comprising a reciprocating member operatively connected to said shutters, a motor and mechanism operatively connecting the motor to said reciprocating member, said mechanism including an overload release operable at any time for releasing said reciprocating member from said motor whether the motor is running or not, and manually operable means for moving said reciprocating member to adjust the shutters.

4. In air distributing means of the character described having a housing provided with an aperture and a plurality of movably mounted shutters for controlling and directing the flow of air through said aperture, a reciprocable member operatively connected to said shutters for oscillating them, power driven means having a yieldable connection to said member for driving it, and manually operable means for moving said member relatively to said power driven means by overcoming the yieldable connection.

5. In air distributing means of the character described having a housing provided with an aperture and a plurality of movably mounted shutters for controlling and directing the flow of air through said aperture, a reciprocable member operatively connected to said shutters for driving them, power driven means having a yieldable connection to said member for driving it, and manually operable means for moving said member relatively to said power driven means by overcoming the yieldable connection, said yielding connection comprising a spring pawl and detent.

6. In air distributing means of the character described having a housing provided with an aperture and a plurality of movably mounted shutters for controlling and directing the flow of air through said aperture, a reciprocable member operatively connected to said shutters for driving them, power driven means having a yieldable connection to said member for driving it, and manually operable means for moving said member relatively to said power driven means by overcoming the yieldable connection, said yielding connection comprising a spring pawl and detent adapted automatically to reengage upon the next succeeding full stroke of said power driven means.

PHILMORE F. SPERRY.